United States Patent [19]
Pender

[11] Patent Number: 6,068,346
[45] Date of Patent: May 30, 2000

[54] ADD-ON SPARE TIRE APPARATUS AND METHOD OF INSTALLATION

[76] Inventor: David R. Pender, 1018 Marion St., Columbia, S.C. 29201

[21] Appl. No.: 09/014,814

[22] Filed: Jan. 28, 1998

Related U.S. Application Data

[63] Continuation-in-part of application No. PCT/US97/09190, May 27, 1997.
[60] Provisional application No. 60/065,955, Nov. 4, 1997, and provisional application No. 60/018,522, May 28, 1996.

[51] Int. Cl.[7] ................................................. B60B 11/10
[52] U.S. Cl. ........................................ 301/40.6; 301/40.3
[58] Field of Search ................................ 301/38.1, 39.1, 301/40.3, 40.6, 5.1

[56] References Cited

U.S. PATENT DOCUMENTS

| | | | |
|---|---|---|---|
| 1,673,816 | 6/1928 | Emerson et al. | 301/38.1 |
| 3,065,995 | 11/1962 | Beacher | 301/40.6 |
| 3,608,970 | 9/1971 | Strumbos | 301/38.1 |
| 3,770,323 | 11/1973 | Isaacson . | |
| 3,866,978 | 2/1975 | Fine . | |
| 4,350,394 | 9/1982 | Lehtinen . | |
| 4,546,807 | 10/1985 | Cummins et al. . | |
| 4,666,216 | 5/1987 | Smith | 301/39.1 |
| 4,708,400 | 11/1987 | Klomp . | |
| 4,929,032 | 5/1990 | Isaacson | 301/38.1 |
| 5,087,103 | 2/1992 | Pompier | 301/39.1 |
| 5,551,762 | 9/1996 | Roopngam | 301/38.1 |

*Primary Examiner*—S. Joseph Morano
*Assistant Examiner*—Long Bao Nguyen
*Attorney, Agent, or Firm*—Dority & Manning

[57] ABSTRACT

An add-on spare tire and method for installation in which the spare tire includes a first (6a, 103) and second wheel half (6b, 104). The first wheel half (6a, 103) includes an attachment plate portion that is attached to the wheel (20) carrying the flat or disabled tire (1). Once attached, the first wheel half (6a, 103) is rotated until the first wheel half (6a, 103) supports the weight of the vehicle. Finally, the second wheel half (6b) is attached to the first wheel half (6a).

10 Claims, 23 Drawing Sheets

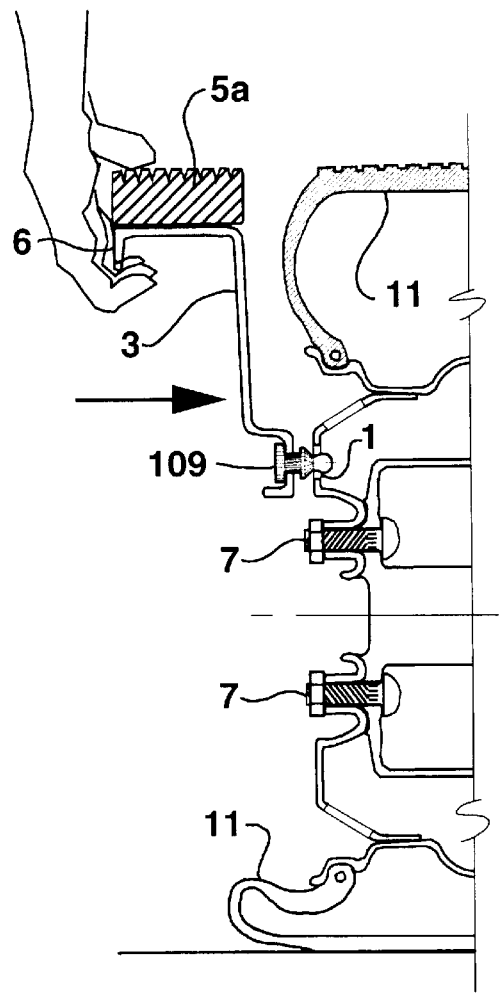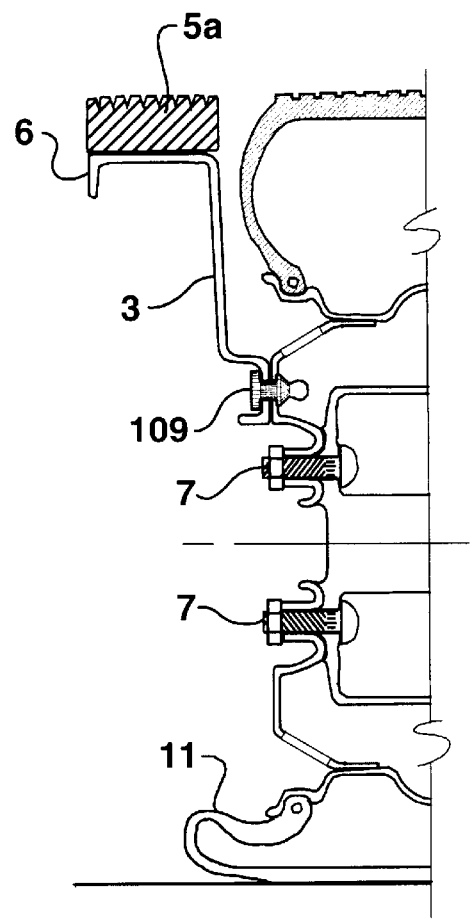
FIG. 25  FIG. 26

ADD-ON SPARE TIRE APPARATUS AND METHOD OF INSTALLATION

RELATED APPLICATIONS

This application is a continuation-in-part of PCT/US97/09190 filed May 27, 1997, currently pending, and which claims the benefit of U.S. Provisional Application 60/018,522 filed on May 28, 1996. This application further claims the benefit of Provisional Application 60/065,955, filed Nov 4, 1997 entitled "Improvement Over Original Add-On Spare Tire System" and having an Express Mail tracking number of EI732717255US.

BACKGROUND OF THE INVENTION

1. Field of the Invention

The invention relates generally to the field of spare tires, and more particularly to spare tires that can be used without removal of the damaged or flat tire from the vehicle.

2. Description of Related Art

One of the most common, and often frustrating, maintenance procedures that a driver must perform is changing a flat tire. To change a flat, a driver must typically execute the following steps: 1) locate the jack in their trunk; 2) lift the vehicle with the jack; 3) remove the lug nuts securing the wheel; 4) remove the wheel carrying the flat tire from the vehicle; 5) remove the spare wheel and tire from the trunk; 6) position the spare wheel on the vehicle; 7) secure the spare wheel with the lug nuts; and 8) lower the vehicle to the ground. While the above procedure has been executed a countless number of times by unfortunate drivers, it is not without its drawbacks. Jacking up a vehicle can be a dangerous proposition for those not familiar with the proper safety precautions. Furthermore, manipulating the flat tire and wheel or spare tire and wheel requires a degree of strength and dexterity not possessed by all drivers.

Various attempts have been made to provide a substitute for the traditional spare tire. For example, U.S. Pat. No. 4,546,807 to Cummins et al. discloses a modular spare tire comprised of a plurality of lightweight T-shaped segments. While the Cummins et al. spare tire uses pieces that are lightweight and easy to manipulate, the original flat tire must still be removed from the vehicle. U.S. Pat. No. 4,708,400 discloses a spare tire that is torqued onto the outside of the disabled wheel through a complex hardware apparatus. U.S. Pat. No. 4,929,032 discloses a two piece spare wheel that can be attached to a modified wheel via cap screws. To attached the second piece, a ramp is used to raise the disabled wheel. Other examples of spare tires for use without removing the flat tire include U.S. Pat. No. 3,866,978 to Fine and U.S. Pat. No. 4,350,394 to Lehtinen. While these inventions may all be useful for their intended purposes, there remains a need for a spare tire that can be mounted on a vehicle without changing the flat that is lightweight and can be installed with a minimum of tools and effort.

SUMMARY OF THE INVENTION

One object of the present invention is to provide an add-on spare tire that can be installed without removing the wheel carrying the flat or disabled tire from the vehicle.

Another object of the present invention is to provide a light weight spare tire that is easy to handle or manipulate.

A further object of the present invention is that the spare tire can be installed with the only required tool being a hammer.

Yet another object is that the spare tire take up less room in a trunk or storage space than a traditional full size spare tire.

According to the present invention, the foregoing and other objects and advantages are attained by a spare wheel comprising a first and second wheel half. The first wheel half includes an attachment plate portion. The attachment plate is attached to the wheel carrying the flat or disabled tire. Once attached, the first wheel half is rotated until the first wheel half supports the weight of the vehicle. Finally, the second wheel half is attached to the first wheel half.

Additional objects and advantages will become apparent from a consideration of the following description and drawings.

BRIEF DESCRIPTION OF THE DRAWINGS

FIG. 25 is a cutaway view showing the reception of the hanger pin to the wheel carrying the flat tire as seen in FIG. 24.

FIG. 26 is a view similar to FIG. 25 illustrating the upper spare segment locked into place.

DETAILED DESCRIPTION

Figure 1:
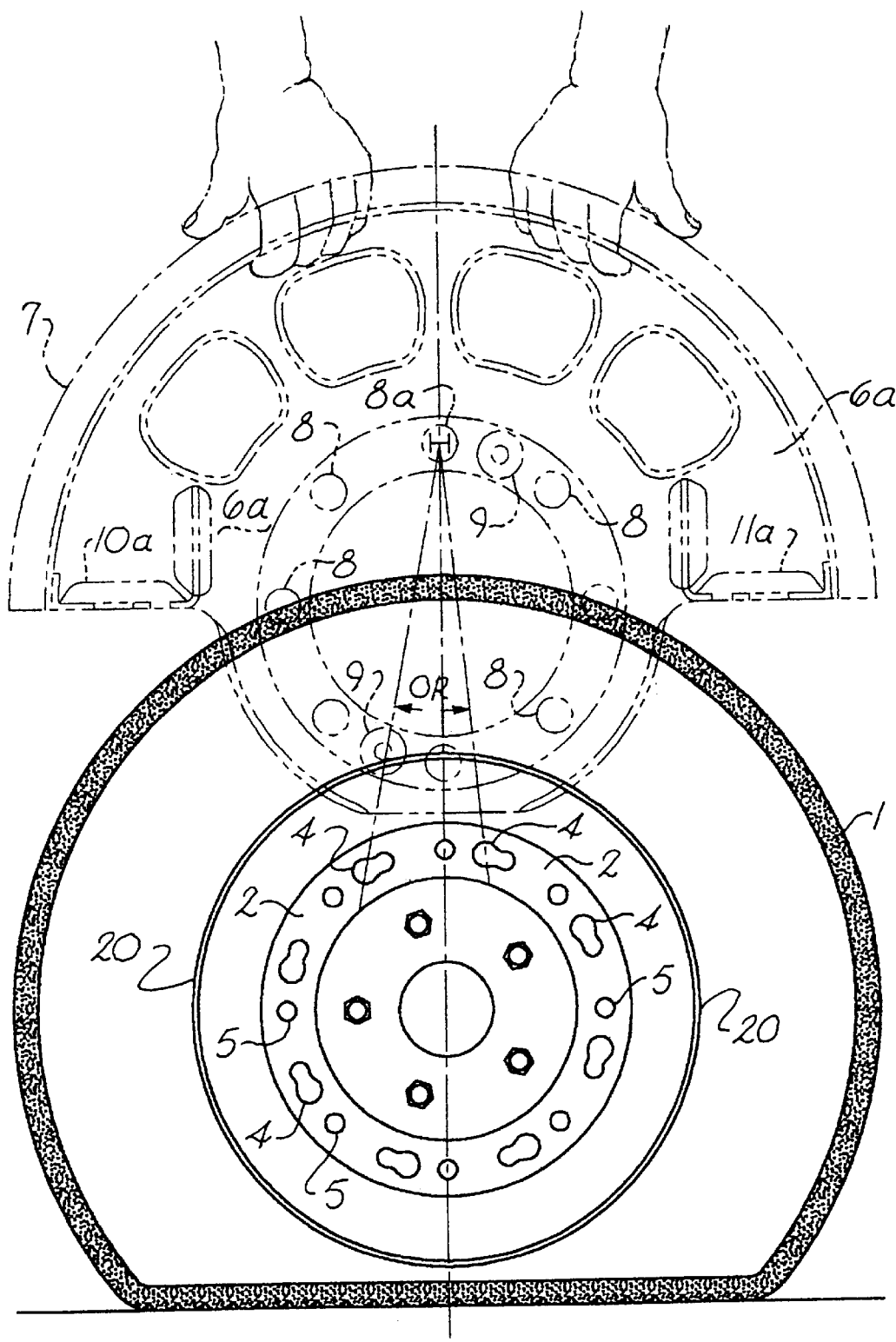
FIG. 1 is a plan view of a flat tire carried on a wheel that is modified to accept the add-on spare tire.

With reference to the figures, an apparatus that achieves all the various objects of the present invention will now be described. The add-on spare tire is made from two primary components: 1) a first wheel half 6a that mounts to wheel rim 20 carrying disabled or flat tire Y (see FIG. 2), and 2) a second wheel half 6b that mounts to first wheel half 6a (see FIG. 11). However, to use the spare tire, some minor modifications to wheel rim are required. As shown in FIG. 1, wheel rim 20 contains a modified region 2 in which a plurality of apertures encircle lug nuts 3. These apertures include keyhole apertures 4 and plate lock apertures 5 used to attach wheel half 6a to wheel rim 20. The procedure for installing the spare wheel will now be described.

Figure 2:
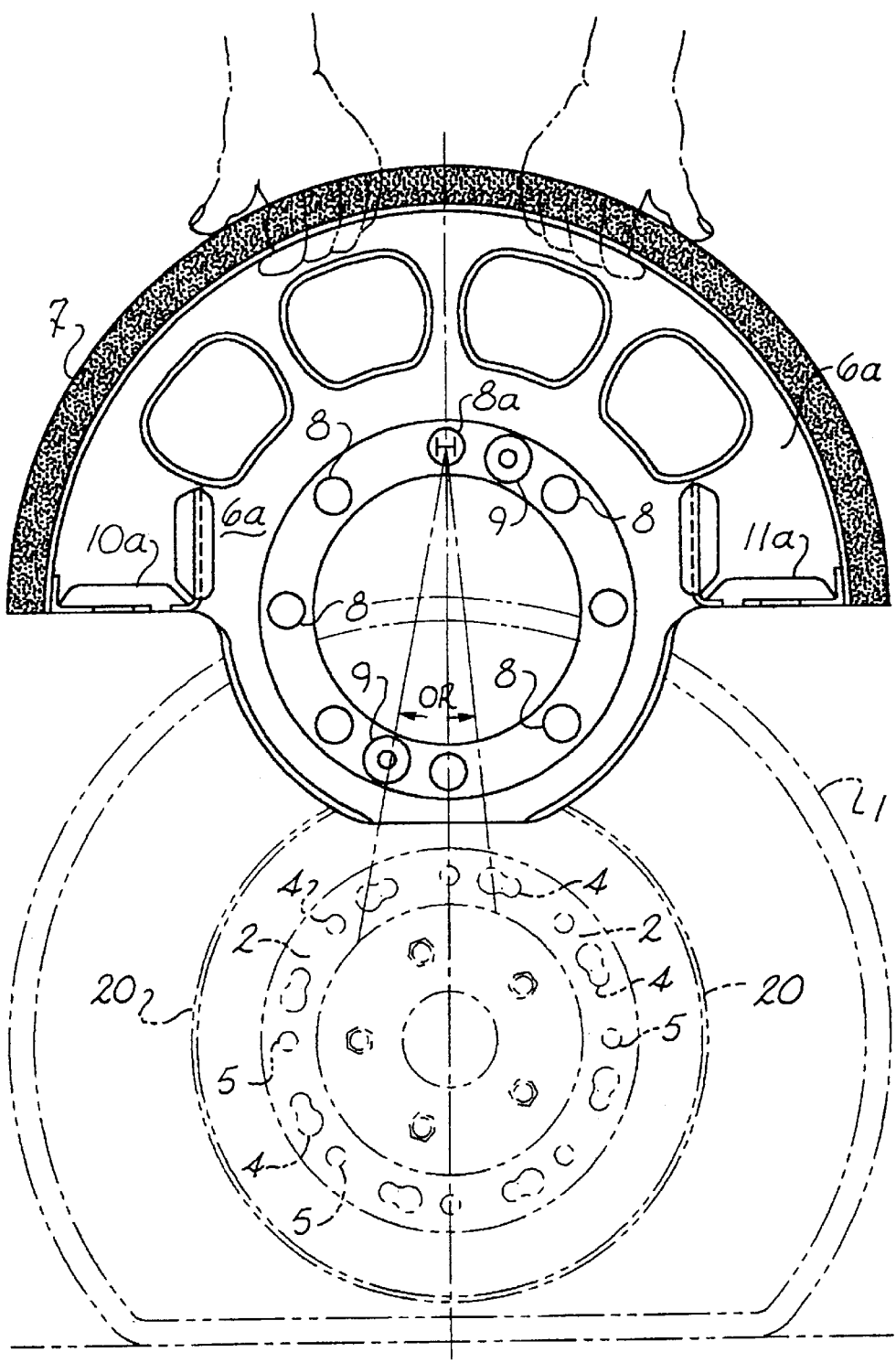
FIG. 2 is a plan view of a first wheel half with an attachment plate according to the invention.
Figure 3:
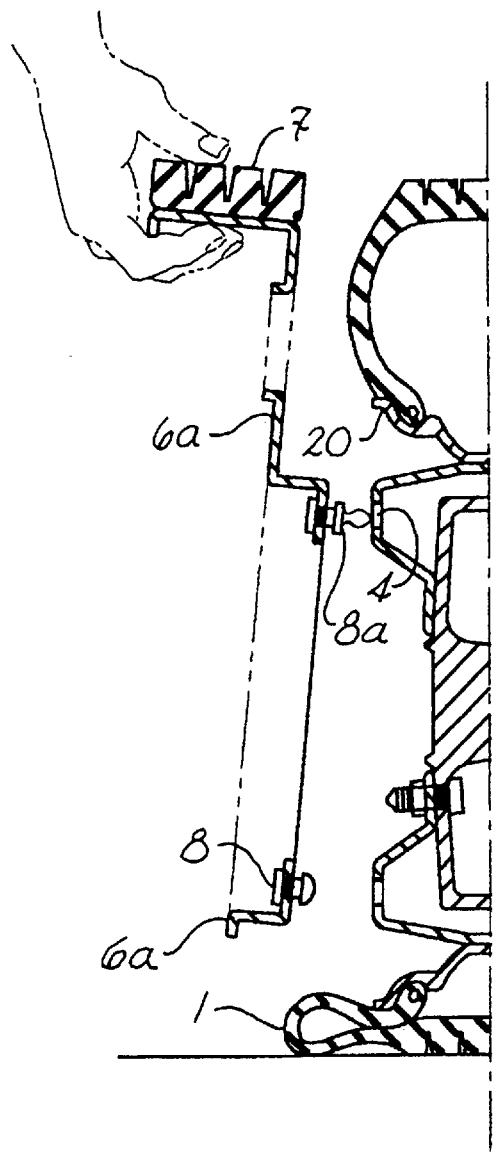
FIG. 3 is a cutaway view showing reception of the hanger pin in the wheel carrying the flat tire.
Figure 5:
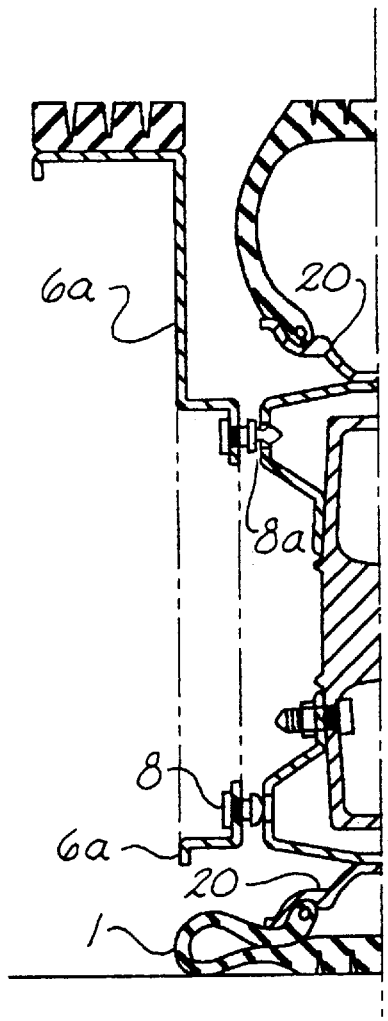
FIG. 5 is a cutaway view showing reception of the pins extending from the attachment plate in the keyhole apertures of the wheel carrying the flat tire.
Figure 4:
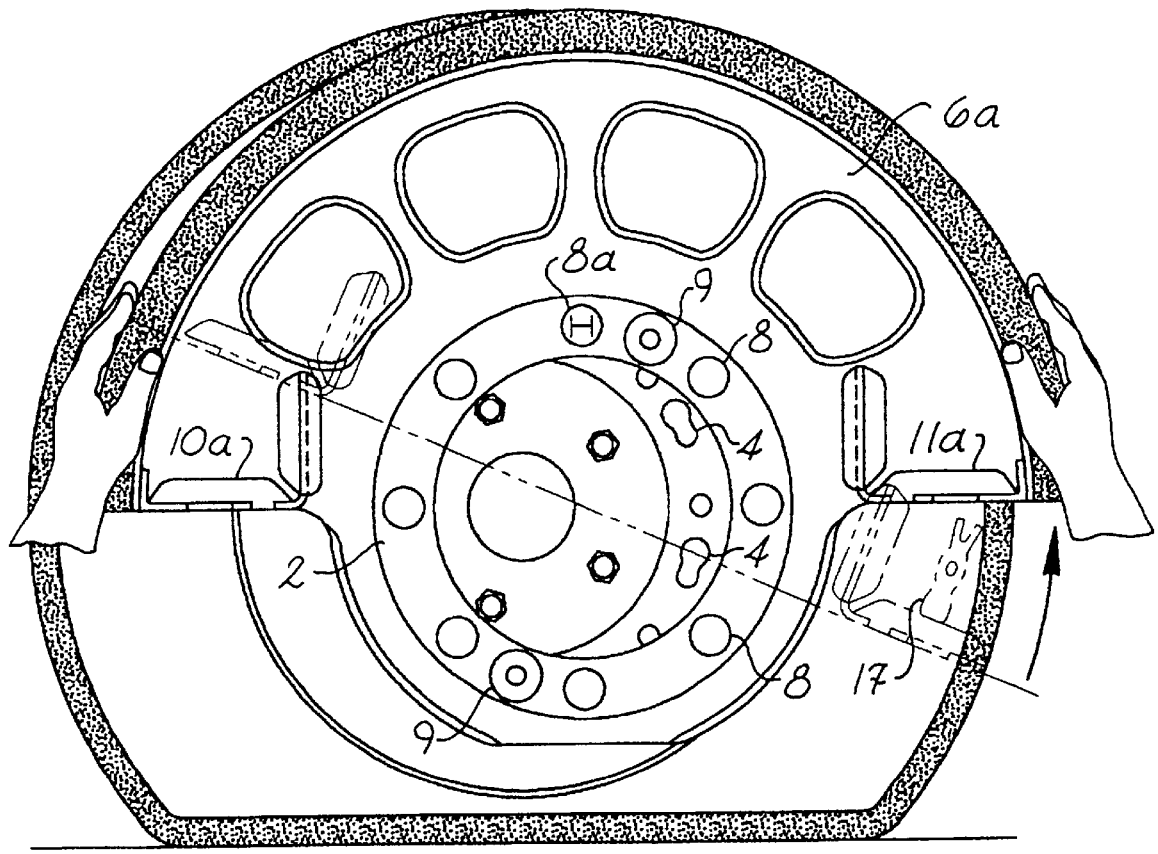
FIG. 4 illustrates seating of the pins extending from the attachment plate in the keyhole apertures of the wheel carrying the flat tire.
Figure 6:
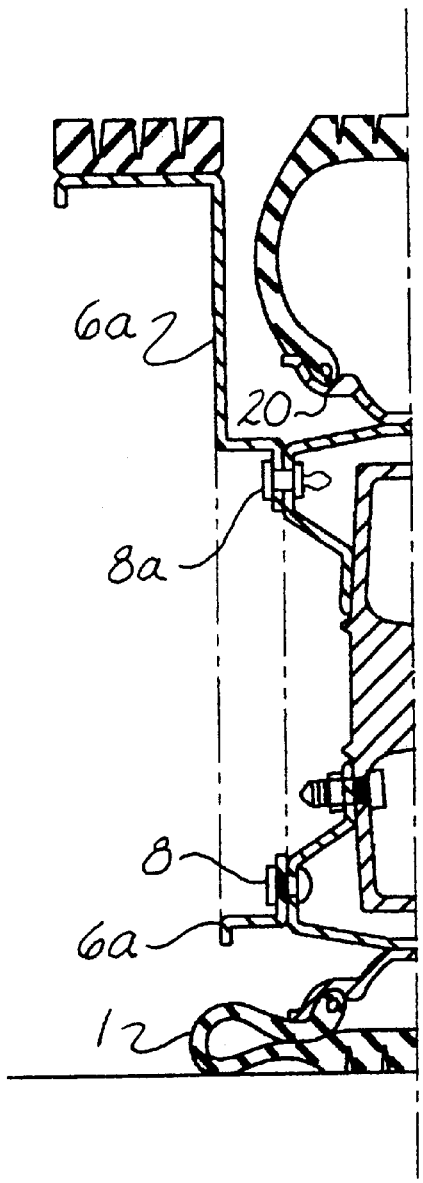
FIG. 6 is a cutaway view showing the pins extending from the attachment plate having been received in the keyhole apertures of the wheel carrying the flat tire.
Figure 7:
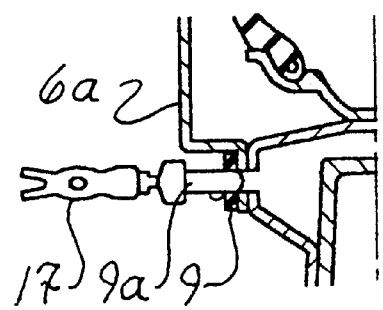
FIG. 7 is a cutaway view illustrating insertion of a plate lock pin to secure the attachment plate to the wheel carrying the flat tire.
Figure 10:
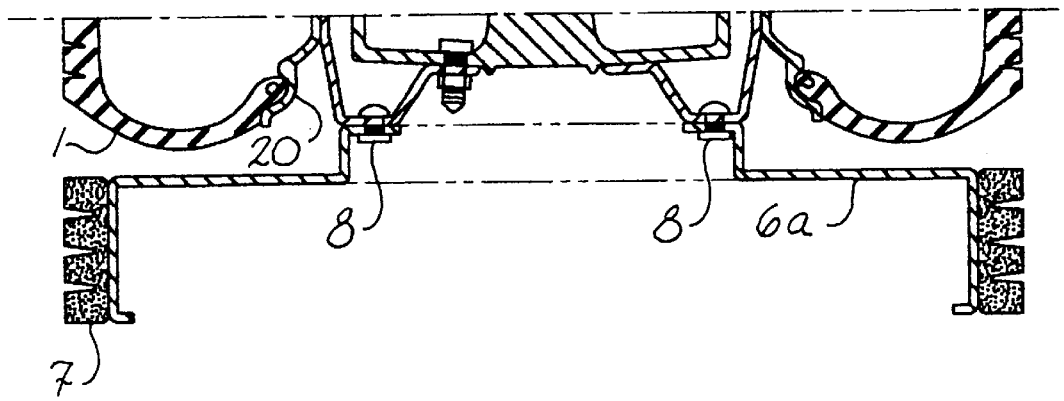
FIG. 10 is another cutaway view showing the pins extending from the attachment plate having been received in the keyhole apertures of the wheel carrying the flat tire.

The driver begins the installation process by removing wheel half 6a from the trunk or other storage compartment of the vehicle. Because wheel half 6a is approximately one-third the size of a full size spare, it is much easier to retrieve and manipulate. Preferably, the two wheel halves 6a and 6b are designed to provide a wheel and tire that is approximately the same circumference as the other wheels and tires on the vehicle; however, the width of the two wheel halves 6a and 6b is generally only one-half the width of the other wheels. Thus, the spare wheel according to the instant invention provides the weight advantages of a "space saver" spare with the safety advantages of a full size spare. Ensuring that the add-on spare tire has the same circumference as the vehicle's regular tire will prevent friction between the flat tire and the highway when driving to the repair shop. Wheel half 6a contains an attachment plate region defined by a plurality of keyhole slot pins 8 arranged in a circular pattern to match keyhole apertures 4 in wheel rim 20 (see FIG. 2). As shown in FIGS. 2 and 3, the keyhole slot pin 8a in the top center of the attachment plate is used as hanger pin. Hanger pin 8a is matched to the keyhole aperture 4 located closest to the top of wheel rim 20 (i.e., the keyhole nearest the twelve o'clock position). With hanger pin 8a inserted in a keyhole aperture 4 as depicted in FIG. 5, the driver then rotates wheel half 6a until the other keyhole slot pins 8 line up with keyhole apertures 4 (see FIG. 4). Keyhole apertures 4 are configured with a large opening portion and a small opening portion shown best in FIG. 1. The driver will push keyhole slot pins 8 into the large opening portions of keyhole apertures 4 (see FIGS. 6 and 10). By twisting wheel half 6a in a clockwise motion, the driver forces slot pins 8 into the small opening portions of keyhole apertures 4 to attach wheel half 6a to wheel rim 20 (see FIG. 4). A hammer can be used to firmly seat keyhole slot pins 8 into the small opening portions of keyhole apertures 4. Preferably, keyhole apertures 4 will have beveled edges to facilitate the shifting of keyhole slot pins 8 from the large opening portion to the small opening portion of keyhole apertures 4. While keyhole slot pins 8 can withstand strong pullout forces, they nevertheless could slip out of the small opening portions of keyhole apertures 4 back into the large opening portions of keyhole apertures 4. To prevent this, wheel half 6a contains reinforced apertures 9 (see FIG. 2) in its attachment plate region that correspond with plate lock pin apertures 5 in wheel rim 20 (see FIG. 1). It is customary for plate lock pin apertures 5 to be interposed between keyhole apertures 4 to guarantee a mate plate lock pin aperture 5 for every reinforced aperture 9. Plate lock pins 9a are then driven through reinforced apertures 9 and plate lock pin apertures 5 with hammer 17 shown in FIG. 7. Plate lock pins 9a are designed to withstand strong shear forces, but cannot resist strong pullout forces. However, the combination of plate lock pins 9a and keyhole slot pins 8 serve to secure wheel half 6a to wheel rim 20.

Figure 8:
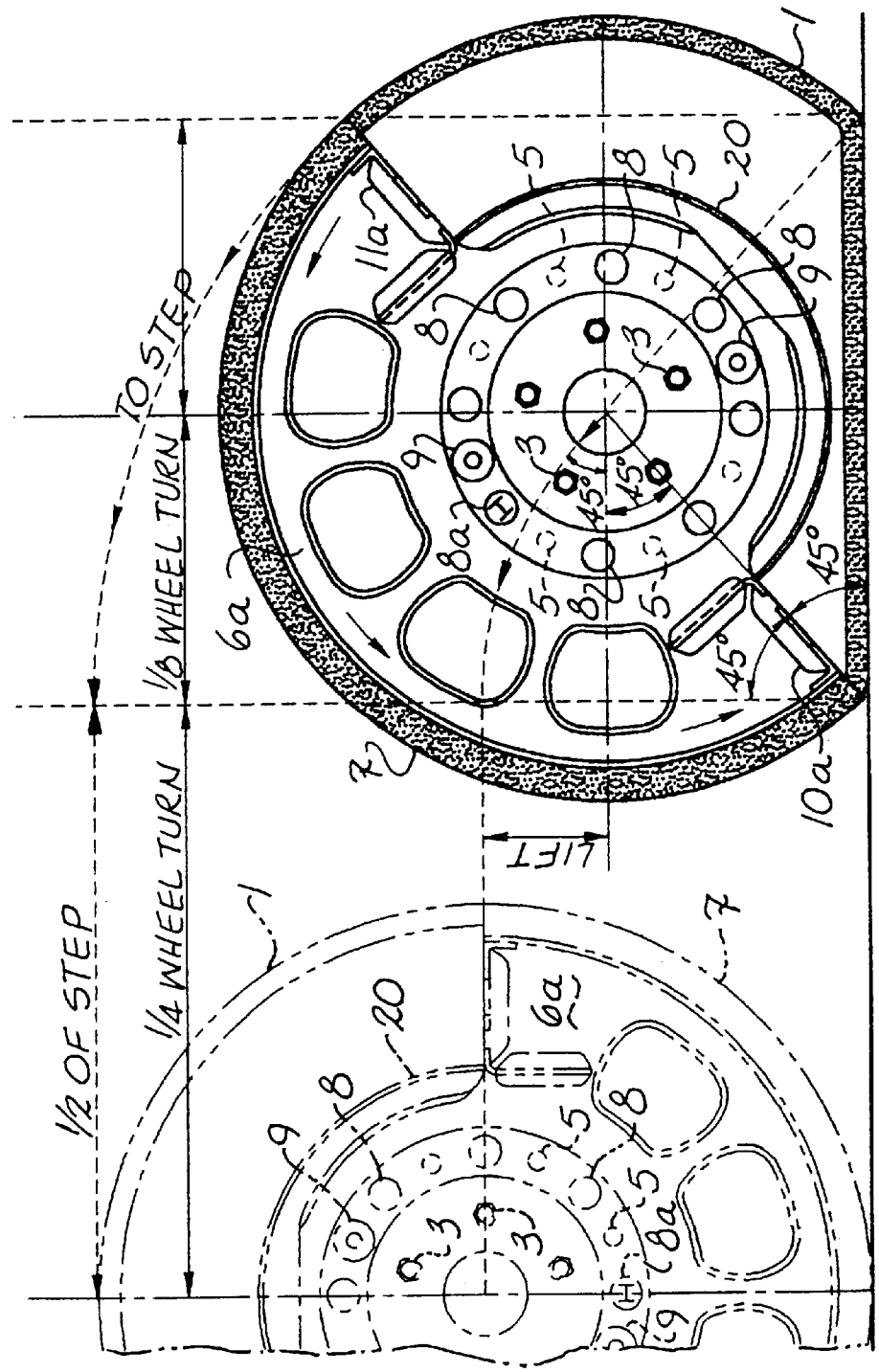
FIG. 8 illustrates rotation of the first wheel half with the attachment plate from a position of non-support to a position that it supports the weight of the vehicle.
Figure 9:
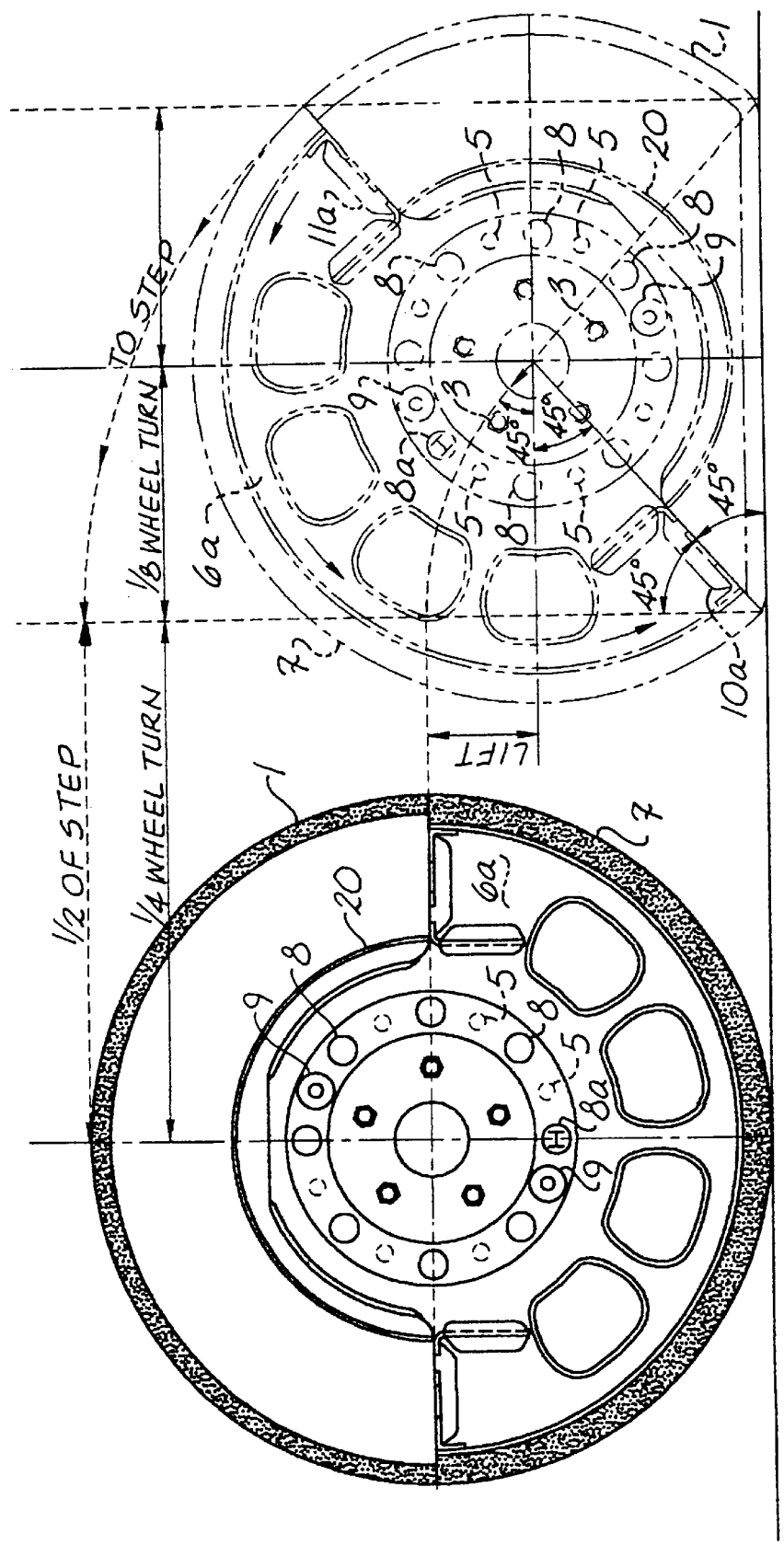
FIG. 9 shows the first wheel half with the attachment plate in a position that supports the weight of the vehicle.

Once wheel half 6a is securely attached to wheel rim 20, the driver then uses the vehicle's sown power to rotate wheel half 6a from a non-supporting position as shown in FIG. 8, to a position where it supports the weight of the vehicle as shown in FIG. 9. This maneuver requires some skill on the part of the driver since enough power must be supplied to force the vehicle upon wheel half 6a, but too much power will cause the vehicle to "fall off" wheel half 6a and once again rest on flat or disabled tire 1.

Figure 12:
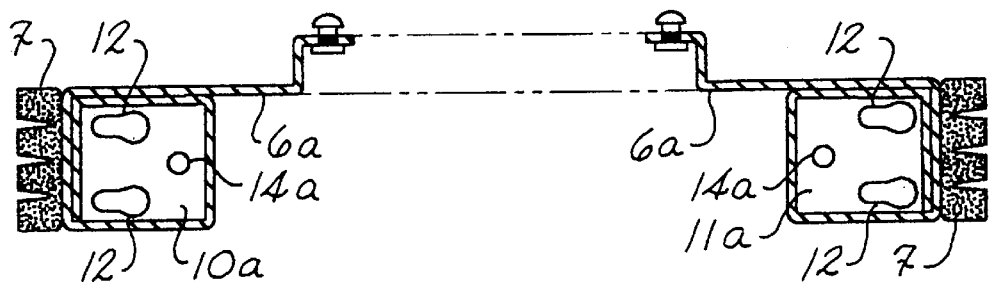
FIG. 12 is an elevation view showing the mating plates of the first wheel half with the attachment plate.
Figure 11:
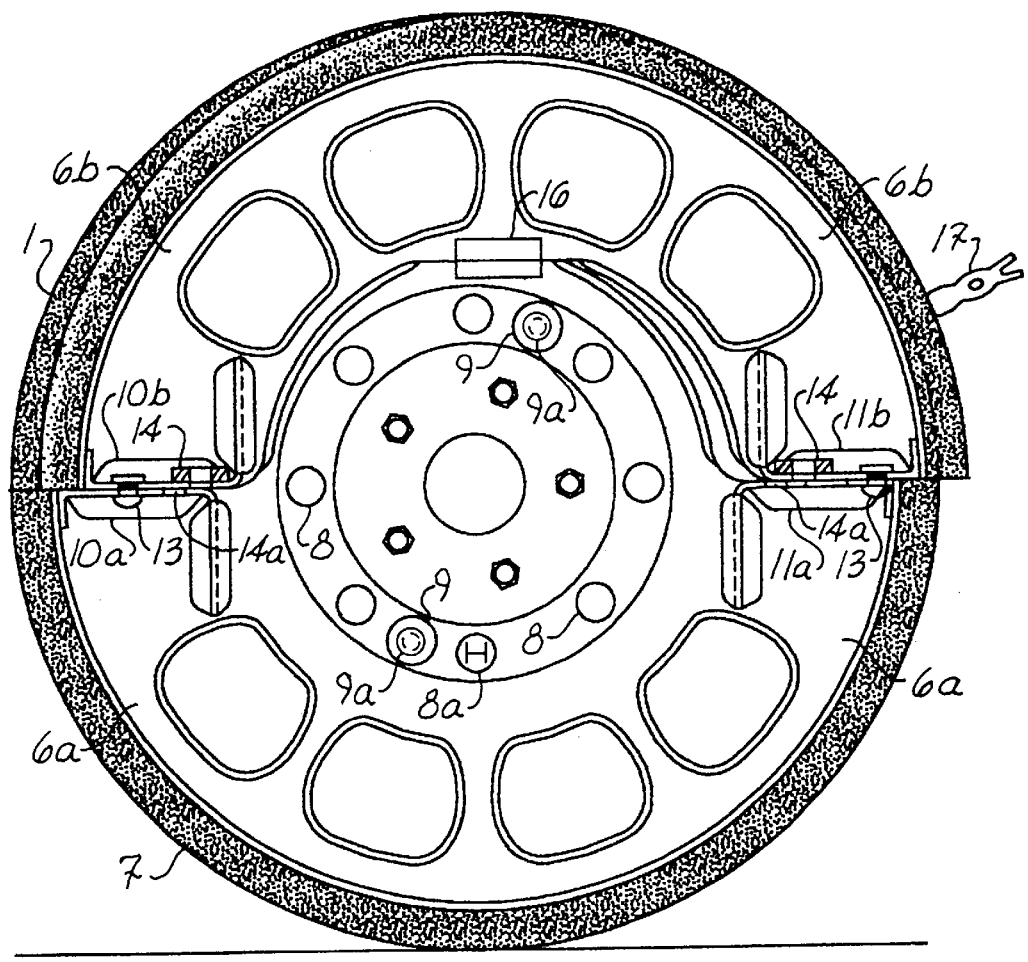
FIG. 11 depicts the second wheel half being mounted to the first wheel half with the attachment plate.
Figure 13A:
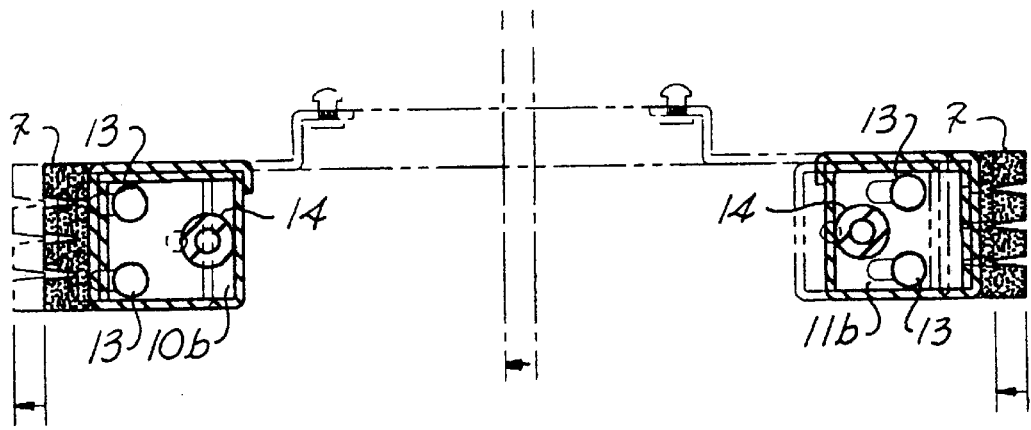
FIGS. 13A and 13B are sectional views showing the mating plates of the second wheel half.
Figure 13B:
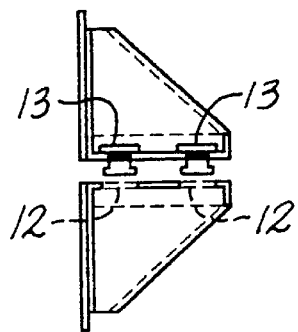
Figure 14:
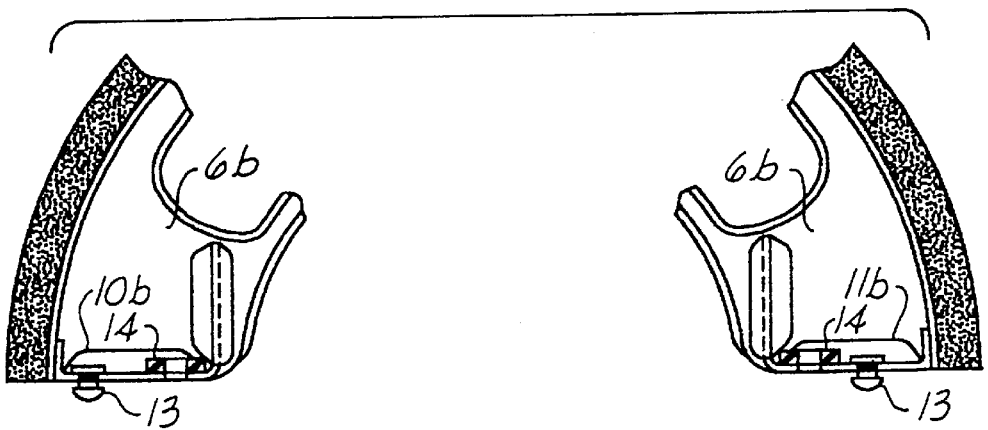
FIG. 14 shows the pins extending from the mating plates of the second wheel half.
Figure 15:
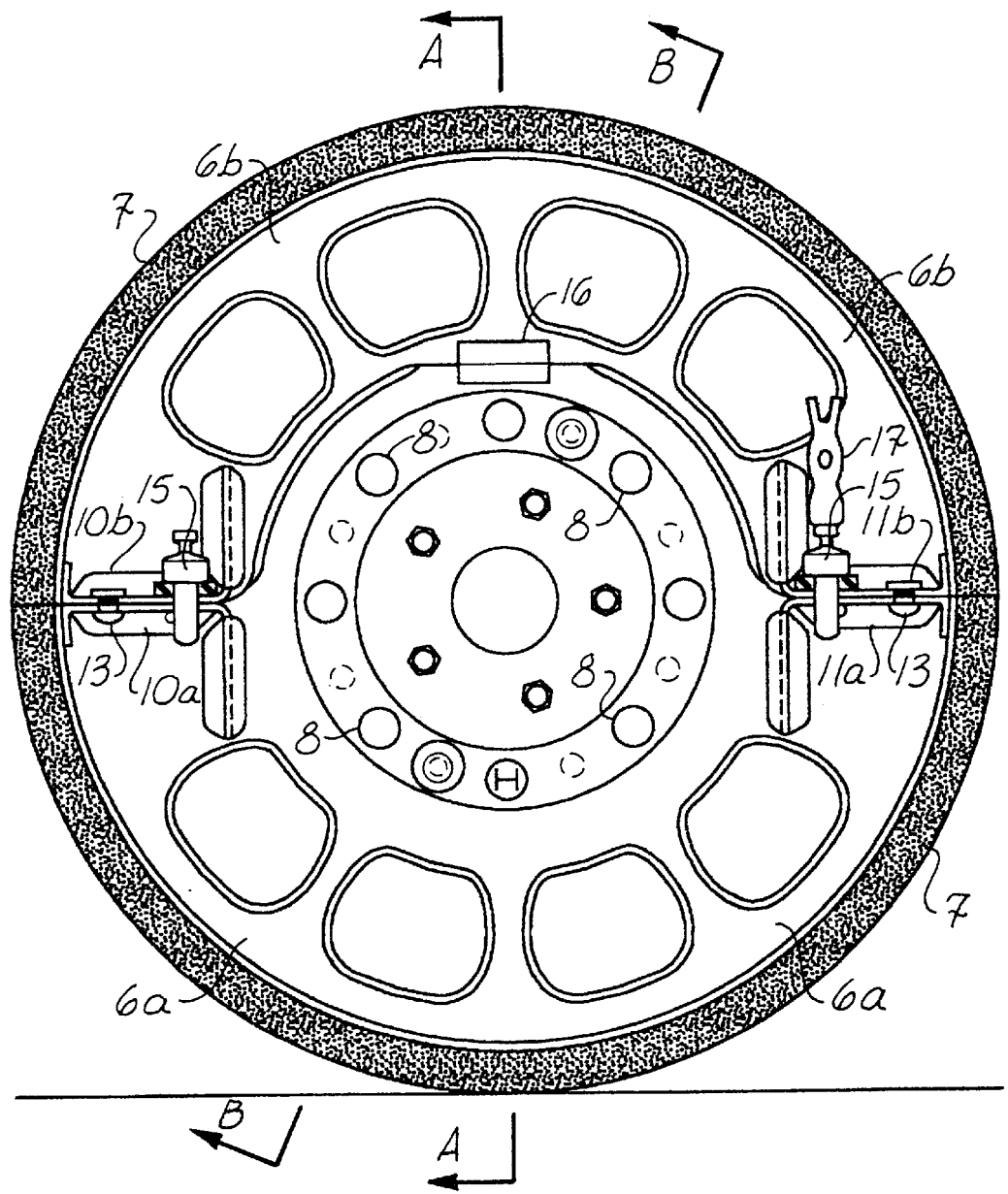
FIG. 15 shows the insertion of wheel lock pins to secure the second wheel half to the first wheel half with the attachment plate.
Figure 16:
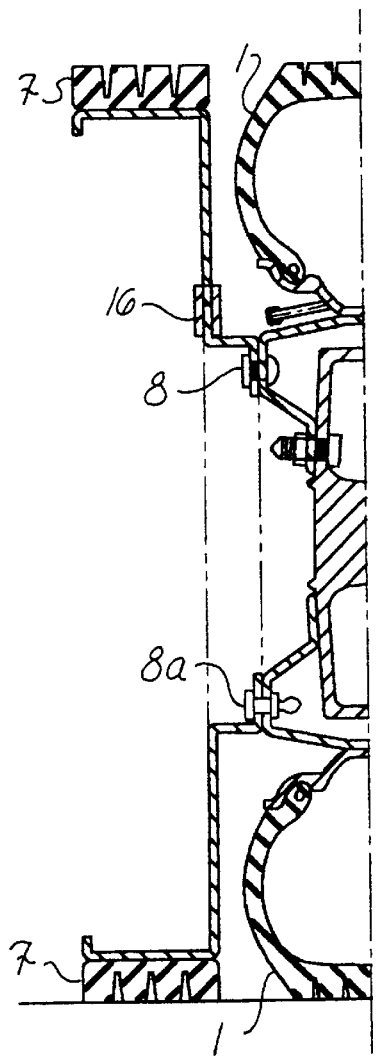
FIG. 16 is a cutaway view taken along line A of FIG. 15.
Figure 17:
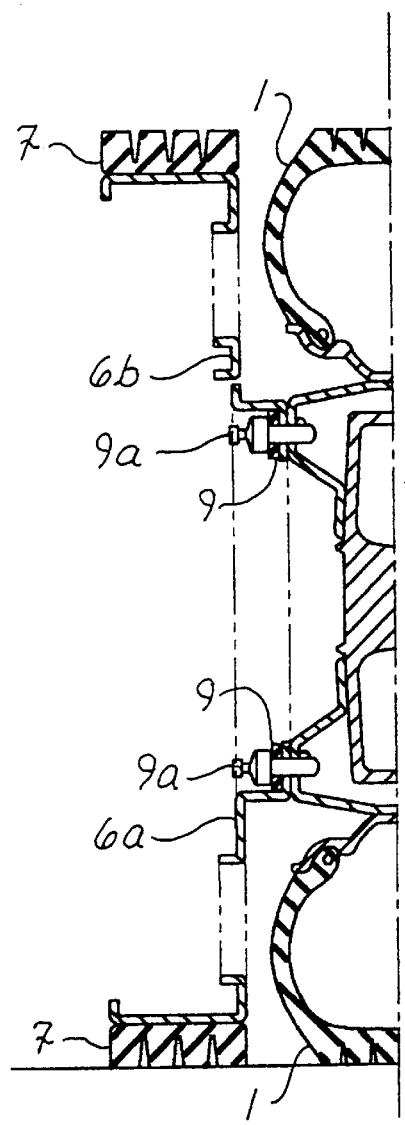
FIG. 17 is a cutaway view taken along line B of FIG. 15.

When the driver has succeeded in rotating wheel half 6a into a support position, wheel half 6b can then be attached. FIG. 11 depicts wheel half 6b being joined to wheel half 6a. The two wheel halves are joined using a similar procedure as was used to attach wheel half 6a to wheel rim 20. Wheel half 6a has a pair of mating plates 10a and 11a that correspond to a pair of mating plates 10b and 11b on wheel half 6b (see FIG. 11). The mating plates could be welded on to the two halves or the plates could be stamped into the wheel halves when the halves are formed. FIG. 12 provides a view looking down on mating plates 10a and 11a and shows keyhole apertures 12 and wheel lock pin apertures 14a. These apertures perform an analogous function to keyhole apertures 4 and plate lock pin apertures 5 in wheel rim 20. FIGS. 13A and B show keyhole slot pins 13 and reinforced apertures 14 that are analogous to the identical parts on the attachment plate of wheel half 6a. As shown in FIGS. 11 and 14, keyhole slot pins 13 are inserted into the large opening portions of keyhole apertures 12 and then shifted into the small opening portions of keyhole apertures 12. Hammer 17 can be used to firmly seat keyhole slot pins 13 into the small opening portions of keyhole apertures 12 as shown in FIG. 11. To secure the two wheel halves together, wheel lock pins 15 are driven through reinforced apertures 14 and wheel lock pin apertures 14a with hammer 17 as shown in FIG. 15. FIGS. 16 and 17 are cutaway views of the two wheel halves joined together and taken along lines A and B respectively of FIG. 15. To facilitate transfer of load and lateral forces to wheel half 6a, bracket clip 16 is used to connect the body of wheel half 6b to the attachment plate of wheel half 6a as shown in FIGS. 11, 15 and 16.

Figure 18:
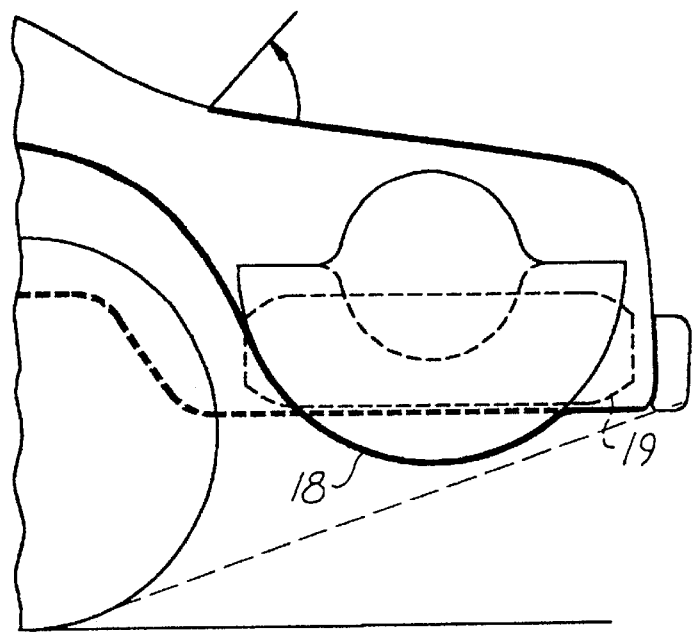
FIG. 18 shows a side view of a trunk storage arrangement for the add-on spare tire according to the invention.
Figure 19:
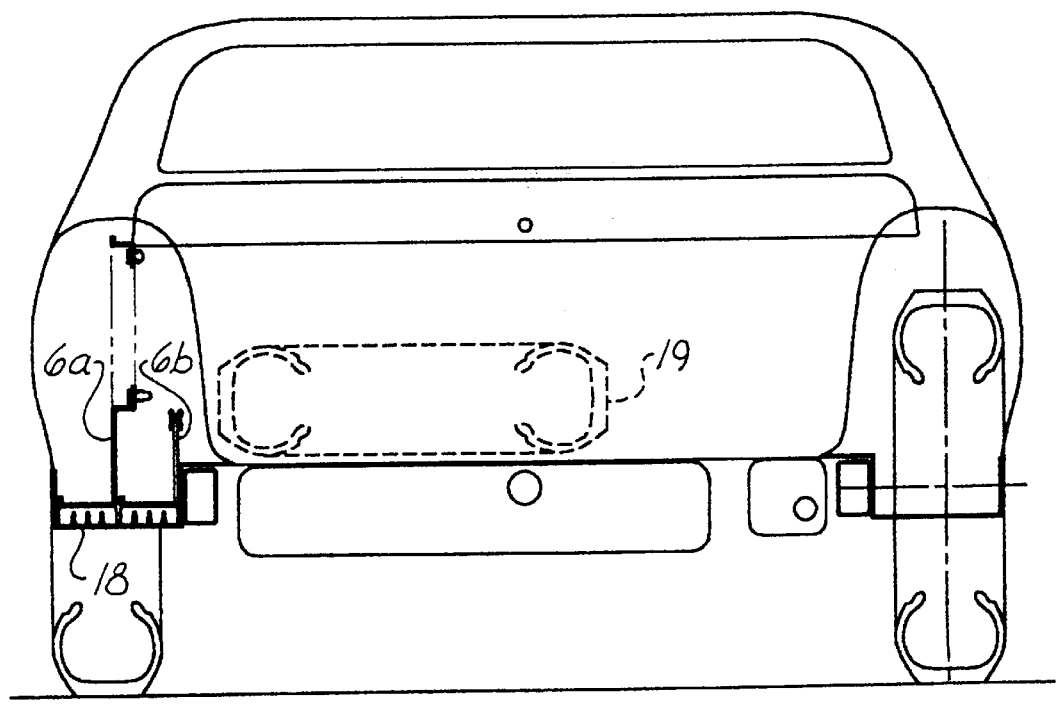
FIG. 19 shows a rear view of a trunk storage arrangement for the add-on spare tire according to the invention.
Figure 20:
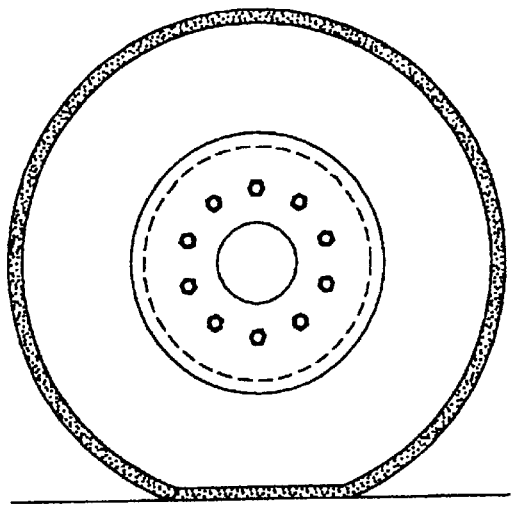
FIG. 20 shows a wheel carrying a flat tire with long lug nut bolts.

FIGS. 18 and 19 illustrate the space saving capabilities of the instant invention over traditional spare tires. Because the add-on spare tire and wheel comes in two halves, it can be stored in fender well area 18. Side by side, wheel halves 6a and 6b are no wider than a standard tire; however, wheel half 6a is just a little more than half as tall as a standard tire thus allowing the two halves to easily store in a fender well. By contrast, traditional spare 19 takes up significant space in the center of the trunk or in a compartment below the trunk area that otherwise could be used for additional trunk space.

Another useful feature of the instant invention is that tread 7 (FIG. 1 and FIG. 11) is merely rubber bonded to the peripheries of the wheel halves. This alleviates the especially distressing discovery that one's spare tire has lost its air pressure after completing the installation and lowering the vehicle to the ground.

Perhaps the most useful feature of the instant invention is that the spare can be installed with the use of only one tool—a hammer. Instead of fumbling with jacks, ratchets, sockets and wrenches, the spare can be installed in a manner of minutes with minimal effort. Moreover, the instant invention is only one-quarter the weight of a traditional spare thus requiring much less physical strength to perform the installation.

Figure 21:
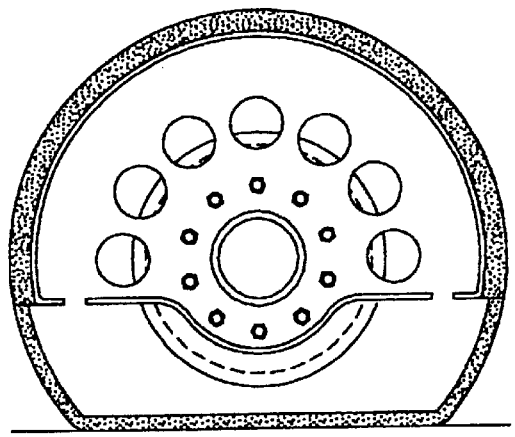
FIG. 21 shows a first wheel half with an attachment plate according to an alternative embodiment of the invention secured by the existing lug nuts.
Figure 22:
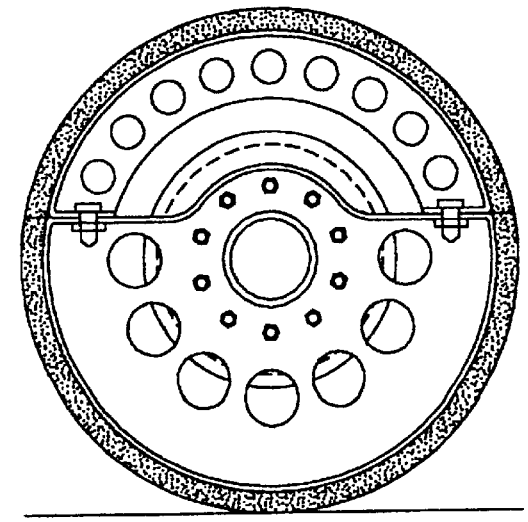
FIG. 22 shows a second wheel half secured to the first wheel half.
Figure 23:
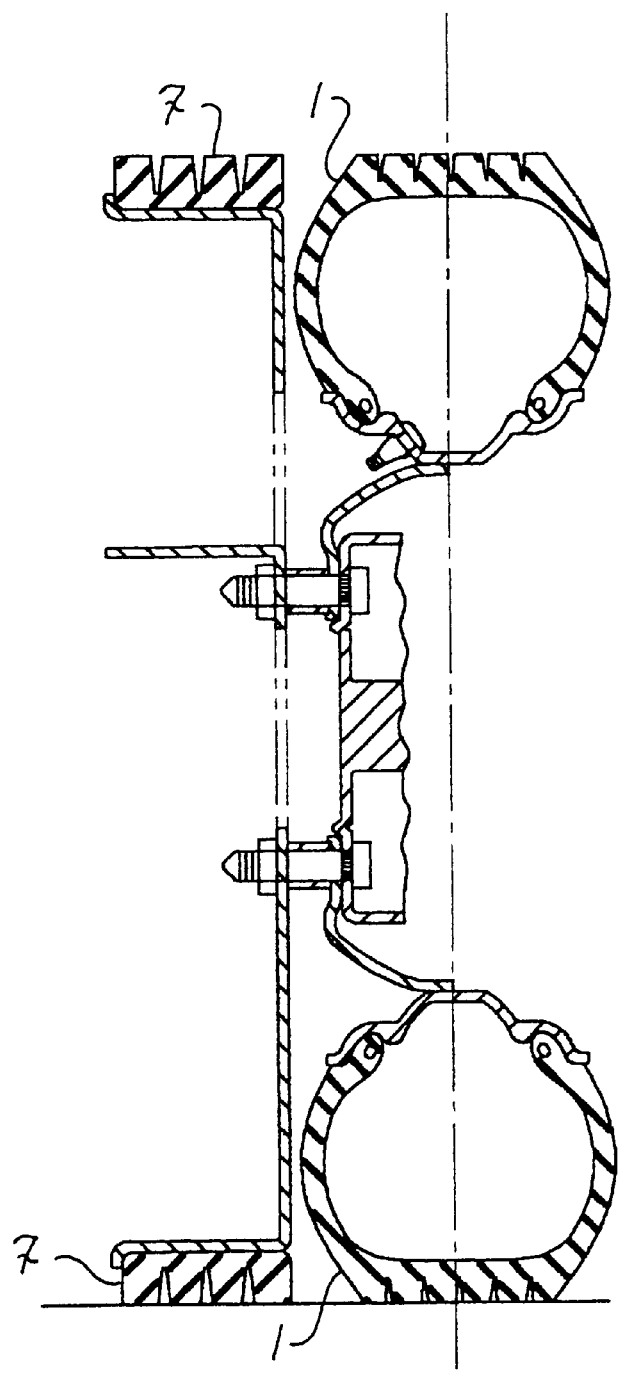
FIG. 23 depicts a cutaway view of the alternative embodiment of the add-on spare tire.

Finally, FIGS. 20 through 23 illustrate an alternative embodiment of the instant invention. Instead of modifying the existing wheel rim, longer lug bolts could be used to allow the wheel half with the attachment plate to be installed on the lug bolts as shown in FIG. 21. The second wheel half of the spare is attached in the same manner as discussed above (FIG. 22). FIG. 23 shows a cutaway view of the lug bolt embodiment taken along line A of FIG. 22. While the lug bolt embodiment requires a wrench or ratchet and socket to remove the lug nuts, it allows existing vehicles to be retrofitted with longer lug bolts to make use of the add-on spare.

The FIGS. 24–34 illustrate an additional alternative embodiment of the instant invention. This additional embodiment requires no tools to install the spare tire segments. Rather, spring loaded pins can be alternatively locked and unlocked which are used to engage the spare tire wheel segments to the original tire wheel. Further, the additional embodiment provides for an add-on spare tire having two segments, a first segment being a larger segment and providing a greater portion of the tread circumference than the second smaller segment.

Figure 24:
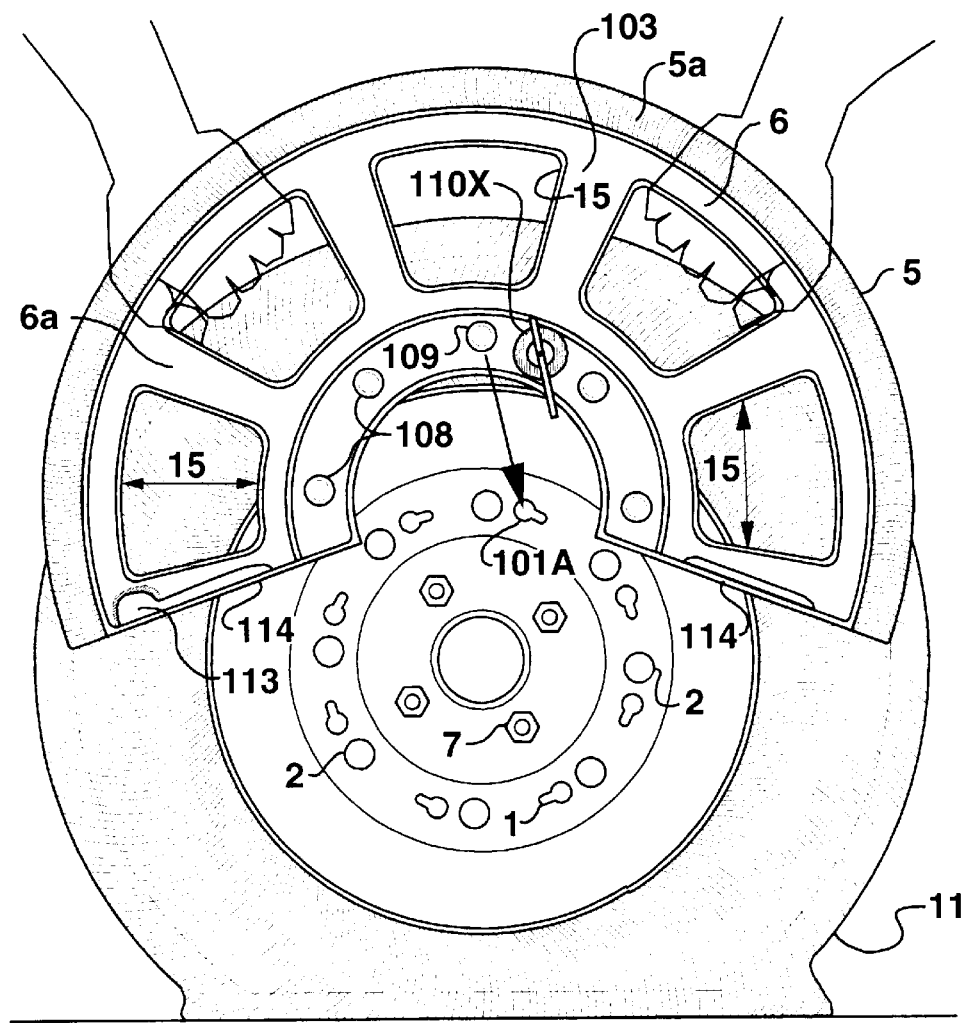
FIG. 24 is a planned view of a flat tire carried on a wheel that is modified to accept the first wheel attachment portion in accordance with this invention.

As seen in FIG. 24 the present embodiment shows the larger wheel segment (103) being anchored to the large part of the top-most key hole (101a), and having 5 key hole lock pins (108), including the Hanger Pin (109) which will engage key holes (101a) near the top.

FIG. 25 shows the Hanger Pin (109) in the large part of the upper most key hole.

FIG. 26 shows the Hanger Pin (109) locked into place. The other 4 key hole lock pins are also locked into place but not shown in FIG. 26. Any set of key hole lock pins on a wheel segment must simultaneously move together and lock together in the small end of the 5 key hole slots 108 on the vehicle wheel. This particular factor is relevant to this current embodiment that uses 2 separate segments locking to the same circle of 8 key hole slots on the vehicle wheel.

It is preferable that one add-on wheel segment (103) should be made larger than the other (105) and that this larger wheel segment be the first to be mounted on the wheel with the flat tire for the following reasons: This larger wheel segment, on rotation, lifts the wheel segment, on rotation, lifts the wheel, takes the load off the flat tire, and supports vehicle weight. To lift this wheel takes extra horse-power (similar to climbing a curb, but not as high). You must accelerate to get up on the "step", so that this larger wheel segment supports vehicle weight. But you must brake quickly before you run out of this wheel segment and fall down off the "step", and then not be able to anchor the second wheel segment.

The larger wheel segment gives the driver more travel distance before falling off the "step". The driver can get up on the "step" by traveling forward or in reverse.

Figure 27:
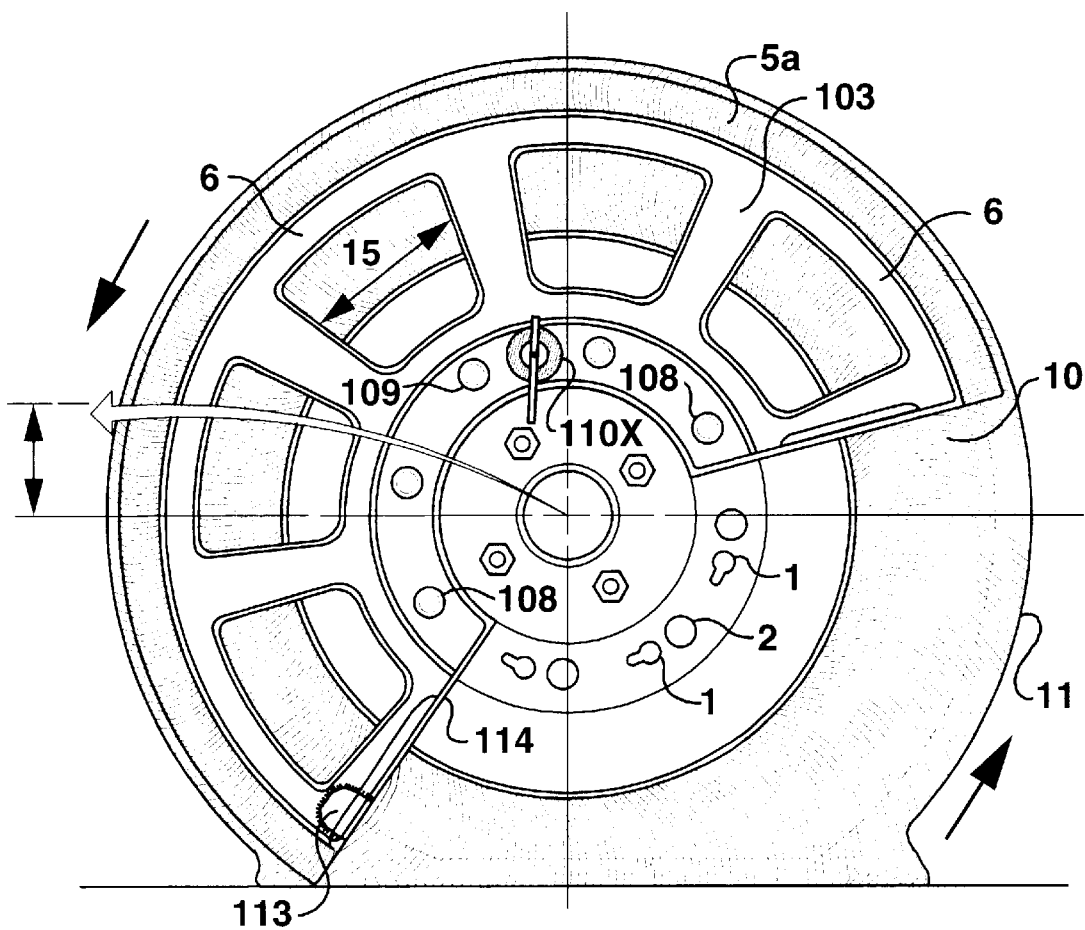
FIGS. 27–28 illustrate rotation of the first wheel half with the attachment plate from a position of non-support to a position that supports the weight of the vehicle.

FIG. 27 illustrates how the vehicle wheel with the flat tire, and with the large wheel segment mounted on the wheel "climbs" up on the step, and indicates the angle of climb, which is less than 45 degrees.

Figure 28:
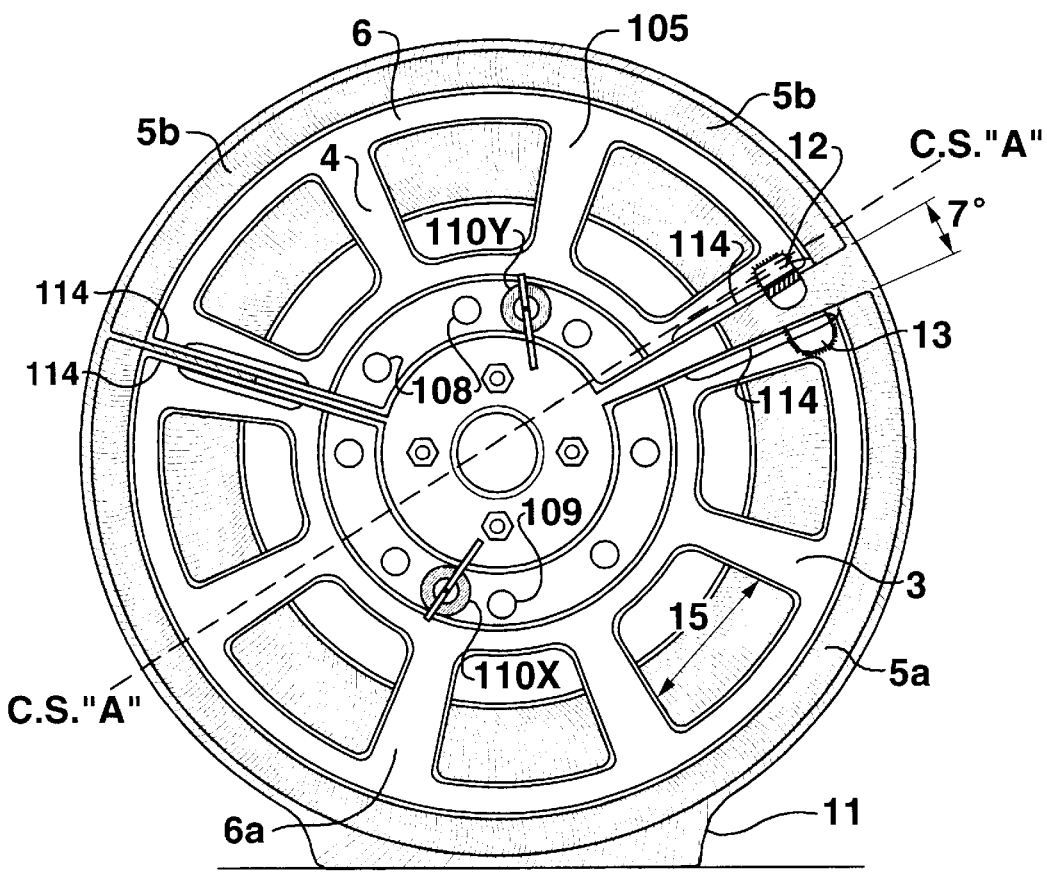

FIG. 28 shows that the small wheel segment (with the 3 key hole slot pins) has been inserted into the large part of the 3 key holes on the vehicle wheel, leaving about a 7 degree gap on the right side of the wheel.

Note that the Lock Pin Unit 110X on the large half of the wheel unit (103) has been locked into place, and the Lock-Pin Unit 110Y on the small half of the wheel unit (105) is still unlocked.

Figure 31:
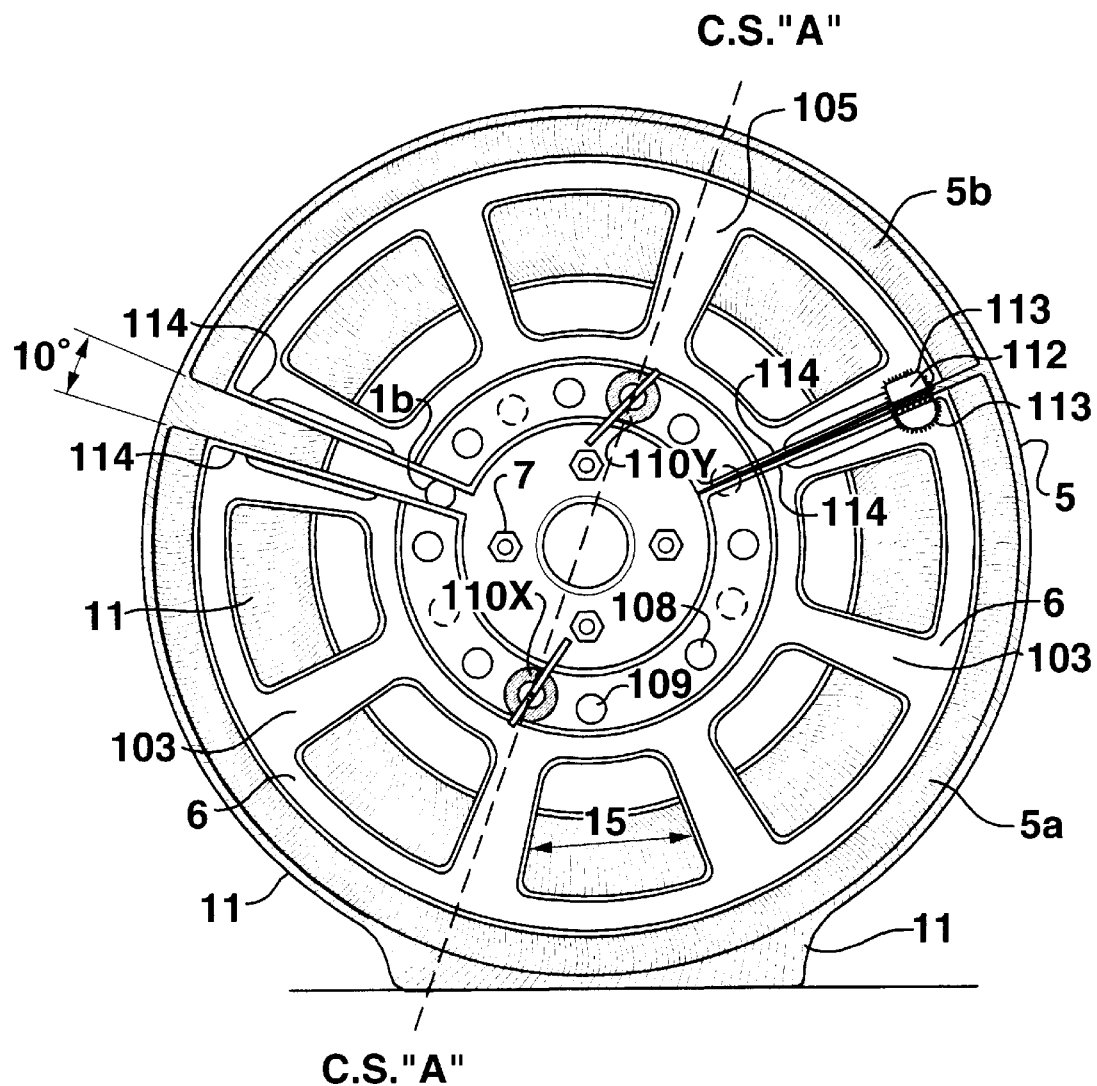
FIG. 31 shows the assembled first wheel portion and second wheel portion secured to the original flat tire.
Figure 32:
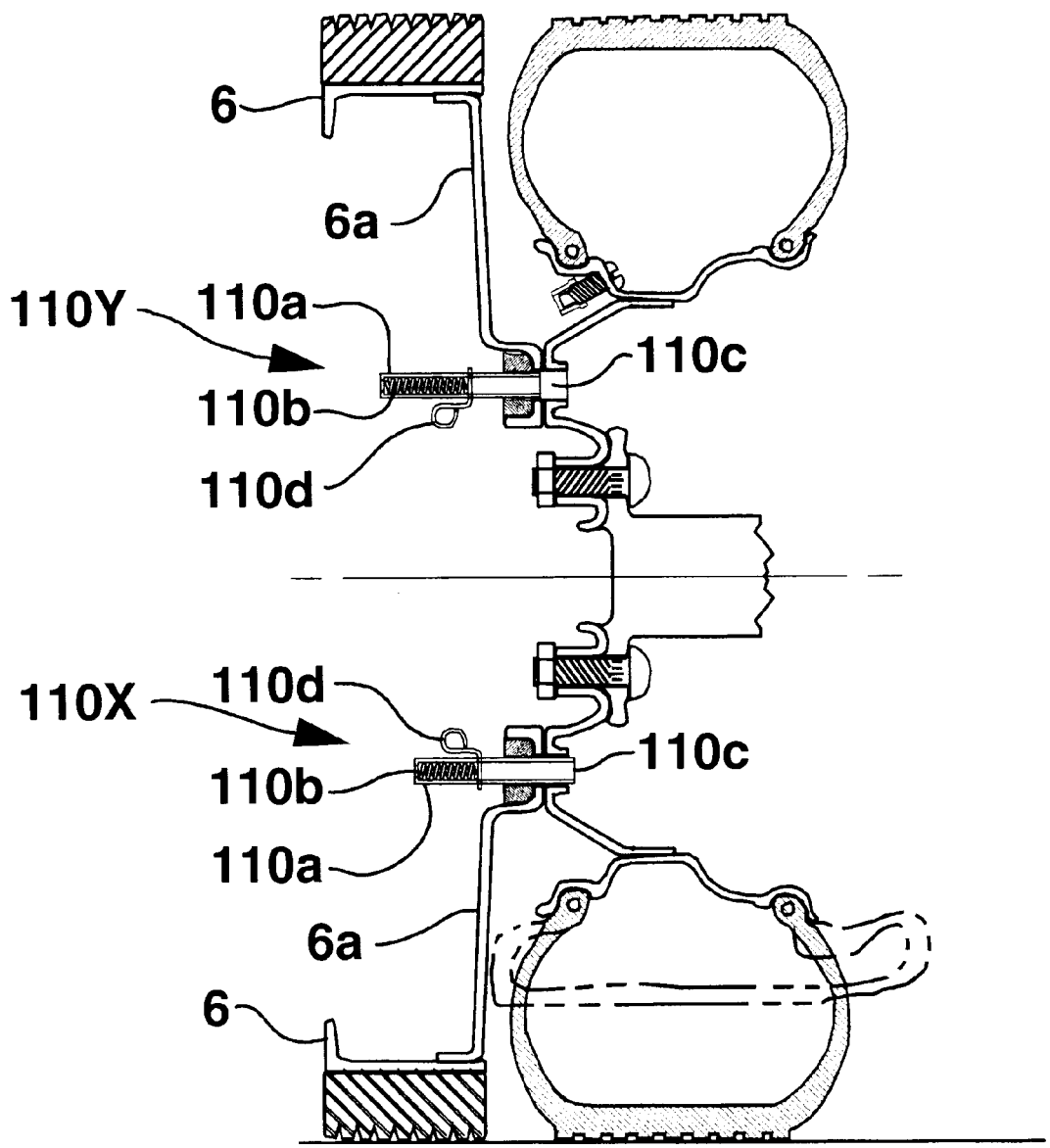
FIG. 32 is a cross-section taken along line "A" of FIG. 31.

This small Add-on wheel segment (104) is then rotated to the right by hand as shown in FIG. 31 and the Lock Pin Unit 110Y is then locked into place.

Note in FIG. 31 that the gap, on the right between the 2 wheel segments is now closed, and the gap on the left is now open. Lock Pin Unit 110Y is now locked in, completing the attachment and anchoring of the add-on spare tire to the vehicle wheel.

Figure 29:
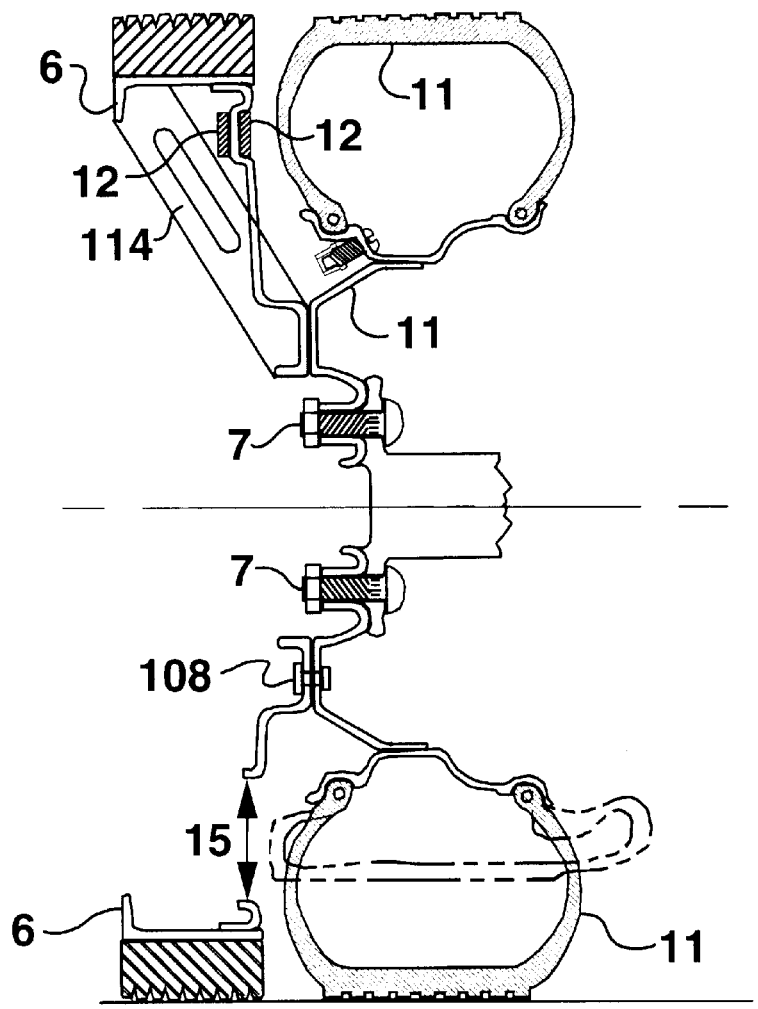
FIG. 29 is a cross-section taken along the line "A" of FIG. 28.
Figure 30:
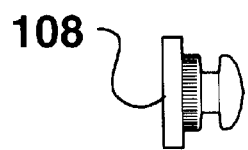
FIG. 30 is an enlarged view of a single keyhole slot pin.

My present method of using the "H" clip is best illustrated in FIG. 28 and in FIG. 31. FIG. 29 gives a section view of the "H" clip (112). First a depression (113) is stamped in the disc of the add-on spare before it is cut into the 2 pieces, and a saw cut is made in the center of that depression. Then the "H" clip (112) is welded to the stamped-in depression on the smaller wheel segment as shown in FIG. 28 and 29 and FIG. 31.

The "H" clip is shown unlocked in FIG. 28 and locked in place in FIG. 31.

This "H" clip is very important in providing the assembled wheel strength to make this a practical invention. Most importantly, it is locked into place to resist lateral forces near the add-on wheel tread, out from the center where this strength is needed. This strength is especially needed because of the unsupported gap on the other side of the wheel. I call this gap a "Reminder gap" because of the little bump it will cause on the way to the tire repair shop.

In summary, the "H" Clip, combined with a stamped depression across the 2 adjacent segments of the add-on Spare Wheel, will resist both lateral and sheer forces on the opposite cut-out or open gap. A cut-out gap of about 10 degrees is provided between the 2 separate, add-on wheel segments.

Figure 33:
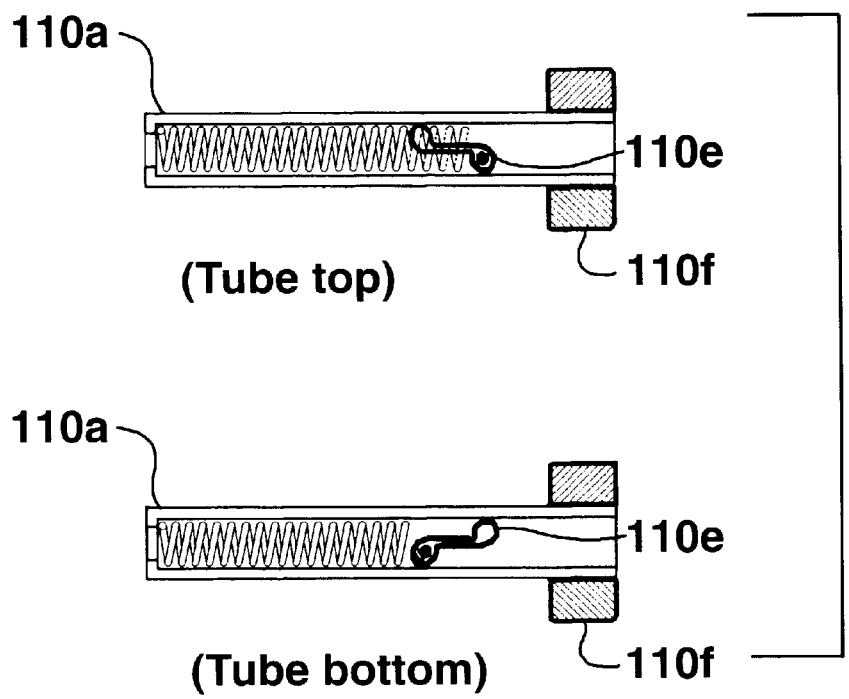
FIG. 33 illustrates the shape of the race defined along the tube top and the tube bottom which facilitates the engagement trigger holding the spring biased pin in place.
Figure 34:
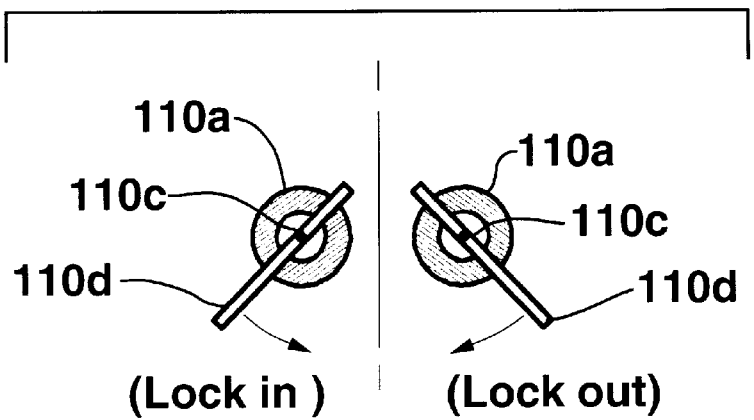
FIG. 34 illustrates the orientation of a trigger in a respective locked in and locked out position.

Each of 2 add-on wheel segments has its own segment of key hole slot pins. The large segment has 5 slot pins and the small segment has 3 slot pins (as compared with all slot pins. 2 pairs of End Plate Braces (114) are provided between the 2 wheel segments to reinforce the spare tire structure. In addition, two built in, permanently attached Lock pins, are provided for each of the 2 wheel segments each having a spring-loaded lock pin that can be locked in or locked out of an anchor hole on the vehicle wheel. The lock pin travels along a race path (110e) defined by the lock pin tube 10a as seen in FIG. 33. Each lock pin (110Y) and (110X) is comprised of a tube (110A) defining a race (110E) which permits the movement of the trigger (110D) along the race. Movement of the trigger allows spring (110B) to slide pin (110C) into a locked position. Trigger (110D) can then be locked into the notch of the race (110E) and securing the attachment mechanism.

The use of a larger wheel segment to be mounted first on the wheel with the flat tire in order to give more travel distance to climb up and stay on the "step".

The above description is given in reference to an add-on spare tire that can be installed on a vehicle without removing the flat or disabled tire. However, it is understood that many variations are apparent to one of ordinary skill in the art from a reading of the above specification and such variations are within the spirit and scope of the invention as defined by the following appended claims:

That which is claimed:

1. A spare wheel for use on a vehicle having a disabled tire without removing a wheel carrying said disabled tire, comprising:

a first wheel half, said first wheel half having an outer periphery and an attachment plate, said attachment plate defining a plurality of pins extending from said attachment plate and adapted for engaging a plurality of keyhole apertures defined in said wheel carrying said disabled tire, said keyhole apertures having a large opening portion and a small opening portion;

a second wheel half, said second wheel having an outer periphery;

means for attaching said second wheel half to said first wheel half;

tread disposed on said outer peripheries of said wheel halves, whereby said attachment plate is attached to said wheel carrying said disabled tire by insertion of said plurality of pins extending from said attachment plate into said large opening portions and rotating said attachment plate so that said pins are held by said small opening portions.

2. The spare wheel of claim 1, wherein said apertures in said wheel carrying said disabled tire include a plurality of plate lock pin apertures and wherein said means for attaching said attachment plate further comprises:

said attachment plate having a plurality of reinforced apertures; and a plurality of plate lock pins;

whereby said attachment plate is secured to said wheel carrying said disabled tire by coupling said reinforced apertures of said attachment plate to said plate lock pin apertures through said plate lock pins.

3. The spare wheel of claim 1, wherein said means for attaching said second wheel half to said first wheel half comprises:

said first wheel half having a plurality of mating plates, each said mating plate having an aperture; and said second wheel half having a plurality of mating plates, each said mating plate having a pin extending therefrom;

whereby said second wheel half is attached to said first wheel half by insertion of said pins extending from said mating plates of said second wheel half into said apertures in said mating plates of said first wheel half.

4. The spare wheel of claim 3, wherein each said aperture in said mating plates of said first wheel half is a keyhole aperture, said keyhole aperture having a large opening portion and a small opening portion;

whereby said second wheel half is attached to said first wheel half by insertion of said pins extending from said mating plates of said second wheel half into said large opening portions and shifting said second wheel half so that said pins are held by said small opening portions.

5. The spare wheel of claim 4, wherein each said mating plate of said first wheel half further includes a wheel lock pin aperture and wherein said means for attaching said second wheel half to said first wheel half further comprises:

each said mating plate of said second wheel half having a reinforced aperture; and a plurality of wheel lock pins;

whereby said second wheel half is secured to said first wheel half by coupling said reinforced apertures of said mating plates of said second wheel half to said wheel lock pin apertures through said wheel lock pins.

6. A spare wheel for use on a vehicle having a disabled tire without removing a wheel carrying said disabled tire, comprising:

a first wheel half, said first wheel half having an outer periphery, an attachment plate, a plurality of mating plates;

each said mating plate of said first wheel half having a keyhole aperture and a wheel lock pin aperture, said keyhole aperture having a large opening portion and a small opening portion;

said attachment plate having a plurality of pins extending therefrom and a plurality of reinforced apertures;

said wheel carrying said disabled tire having a plurality of keyhole apertures and a plurality of plate lock pin apertures, said keyhole apertures having a large opening portion and a small opening portion;

a plurality of plate lock pins;

whereby said attachment plate is attached to said wheel carrying said disabled tire by insertion of said pins extending from said attachment plate into said large opening portions of said keyhole apertures in said wheel carrying said disabled tire and rotating said attachment plate so that said pins are held by said small opening portions and said attachment plate is secured to said wheel carrying said disabled tire by coupling said reinforced apertures of said attachment plate to said plate lock pin apertures through said plate lock pins;

a second wheel half, said second wheel having an outer periphery, a plurality of mating plates;

each said mating plate having a reinforced aperture and a pin extending therefrom;

a plurality of wheel lock pins;

whereby said second wheel half is attached to said first wheel half by insertion of said pins extending from said mating plates of said second wheel half into said large opening portions of said keyhole apertures in said mating plates of said first wheel half and shifting said second wheel half so that said pins are held by said small opening portions and said second wheel half is secured to said first wheel half by coupling said reinforced apertures of said mating plates of said second wheel half to said wheel lock pin apertures through said wheel lock pins; and tread disposed on said outer peripheries of said wheel halves.

7. A method for mounting a spare wheel on a vehicle having a disabled tire without removing a wheel carrying said disabled tire, comprising:

providing a first wheel half, said first wheel half having an attachment plate, the attachment plate defining a plurality of pins extending therefrom;

mounting said attachment plate to said wheel carrying said disabled tire by inserting said pins into keyhole apertures in said wheel carrying said disabled tire;

rotating said attachment plate until said pins are held by said keyhole apertures;

rotating said first wheel half until said first wheel half engages the ground; and attaching a second wheel half to said first wheel half.

8. The method of claim 7, wherein said mounting step further comprises the step of:

inserting a plurality of plate lock pins through a plurality of reinforced apertures in said attachment plate and through a plurality of plate lock pin apertures in said wheel carrying said disabled tire.

9. The method of claim 7, wherein said first wheel half and said second wheel half each have a plurality of mating plates, each said mating plate of said first wheel half having a keyhole aperture, each said mating plate of said second wheel half having a pin extending therefrom and where said attaching step comprises the steps of:

inserting said pins of said mating plates of said second wheel half into said keyhole apertures in said mating plates of said first wheel half; and shifting said second wheel half until said pins are held by said keyhole apertures.

10. The method of claim 9 wherein said attaching step further comprises the step of:

inserting a wheel lock pin through a reinforced aperture in each said mating plate of said second wheel half and through a wheel lock pin aperture in each said mating plate of said first wheel half.

* * * * *